(12) United States Patent
Sasaoka et al.

(10) Patent No.: US 6,782,151 B2
(45) Date of Patent: Aug. 24, 2004

(54) RAMAN AMPLIFIER, OPTICAL TRANSMISSION SYSTEM AND OPTICAL FIBER

(75) Inventors: Eisuke Sasaoka, Yokohama (JP); Masayuki Nishimura, Yokohama (JP); Shigeru Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 121 days.

(21) Appl. No.: 09/752,526

(22) Filed: Jan. 3, 2001

(65) Prior Publication Data

US 2001/0014194 A1 Aug. 16, 2001

(30) Foreign Application Priority Data

Feb. 10, 2000 (JP) ........................................ 2000-033733

(51) Int. Cl.[7] ................................................ G02B 6/42
(52) U.S. Cl. ........................... 385/15; 385/39; 385/123; 385/141
(58) Field of Search ........................... 385/123, 15, 39, 385/141; 359/334, 341.1, 345, 124, 160, 134; 398/79, 81, 92, 157; 372/3, 6, 71

(56) References Cited

U.S. PATENT DOCUMENTS

| | | | |
|---|---|---|---|
| 5,798,853 A | * | 8/1998 | Watanabe ................... 359/160 |
| 6,292,288 B1 | * | 9/2001 | Akasaka et al. ............ 359/334 |
| 6,342,965 B1 | * | 1/2002 | Kinoshita ................... 359/334 |
| 6,519,078 B2 | * | 2/2003 | Miyakawa et al. ......... 359/334 |
| 2001/0021291 A1 | * | 9/2001 | Miyakawa et al. ........... 385/27 |

FOREIGN PATENT DOCUMENTS

| | | |
|---|---|---|
| EP | 0 911 926 | 4/1999 |
| JP | 10-294510 | 11/1998 |
| JP | 11-84440 | 3/1999 |

OTHER PUBLICATIONS

"1.6Tb/s (40×40Gb/s) transmission over 4×100km nonzero–dispersion fiber using hybrid Raman/Erbium–doped inline amplifiers", T.N. Nielsen et al., ECOC '99 Post Deadline Papers, Sep. 30, 1999, pp. 26–27.

"Error–free 32×10 Gbit/s Unrepeatered Transmission over 450 km", J.P. Blondel et al., ECOC '99 Post Deadline Papers, Sep. 30, 1999, pp. 34–35.

Hiroji Masuda, et al, ECOC '98, (1998) (p. 140 is a blank sheet.) Electron. Lett., vol. 34, No. 13.

* cited by examiner

*Primary Examiner*—Hung Xuan Dang
*Assistant Examiner*—Tuyen Tra
(74) *Attorney, Agent, or Firm*—McDermott, Will & Emery

(57) ABSTRACT

A Raman amplifier having a great Raman amplification gain is disclosed. An optical transmission system 1 is provided with an optical fiber 31 for Raman amplification and an optical multiplexer 41 between a transmitter 10 and a receiver 20 in the order of enumeration, and further provided with a pump light source 51 for Raman amplification that is connected with the optical multiplexer 41. The wavelength of signal light to be transmitted from the transmitter 10 to the receiver 20 is at 1.65 μm band, and the wavelength of the pump light that is output from the light source 51 is C-band or L-band. Since the pump light for Raman amplification propagates at a low loss through the optical fiber for Raman amplification, a great Raman amplification gain can be attained by the Raman amplifier.

12 Claims, 3 Drawing Sheets

RAMAN AMPLIFIER, OPTICAL TRANSMISSION SYSTEM AND OPTICAL FIBER

BACKGROUND OF THE INVENTION

1. Field of the Invention

The present invention relates to a Raman amplifier that transmits and Raman-amplifies signal light, an optical transmission system in the relay section of which the Raman amplifier is provided, and an optical fiber that is used for Raman amplification in the Raman amplifier.

2. Related Background Arts

An optical fiber amplifier amplifies signal light in the optical fiber and compensates for the loss when the signal light propagates through an optical transmission line, and is equipped with an optical fiber for amplification of light and means for introducing pump light.

Pump light is introduced through the pump light introducing means into the optical fiber for the light amplification, and the signal light propagating through the optical fiber for the light amplification is amplified and output.

There are two kinds of optical fiber amplifiers: a rare-earth-doped optical fiber amplifier which uses the stimulated emission phenomena of rare earth elements such as Nd and Er, and a Raman amplifier which uses stimulated Raman scattering phenomena.

The rare-earth-doped optical fiber amplifier is modularized and provided in a repeater. On the other hand, the Raman amplifier amplifies signal light with the optical transmission line or the part thereof itself acting as an optical fiber for the light amplification (optical fiber for Raman amplification). In the optical transmission line that uses the Raman amplifier, it is possible not only to reduce the effective loss of the optical transmission line (=transmission loss–Raman amplification gain) but also to restrain the occurrence of the nonlinear optical phenomena which is caused when the power of the signal light becomes too great.

The Raman amplifiers are described in Literature 1: T. N. Nilesen, et al., "1.6 Tb/s (40×40 Gb/s) Transmission Over 4×100 km Nonzero-Dispersion Fiber Using Hybrid Raman/Erbium-Doped Inline Amplifiers", ECOC '99, PD2-2 (1999) and European Patent Application Publication No. EP 0911926 A1, etc.

The Raman amplifier described in Literature 1 is an amplifier which Raman-amplifies signal light of 1.55 μm wavelength band propagating through a dispersion-shifted optical fiber that is an optical transmission line, by introducing pump light of 1.45 μm wavelength into the dispersion shift optical fiber. The invention described in EP 0911926A1 is directed to an optical amplifier for wide wavelength band in which a Raman amplifier and an Erbium-doped fiber amplifier (EDFA) are combined. The Raman amplifier used therein Raman-amplifies signal light of the 1.55 μm wavelength band propagating through the optical fiber for the transmission line and compensates gain deviation of EDFA by introducing pump light of 1.51 μm or 1.53 μm wavelength into the optical fiber for the transmission line.

In a Raman amplifier it is important to make an optical fiber for Raman amplification as long as possible and to make a Raman amplification gain as great as possible. Therefore, it is necessary to enlarge the power of the pump light to be introduced into the optical fiber for Raman amplification or to minimize the transmission loss of the optical fiber for Raman amplification at the pump light wavelength.

As for the Raman amplifiers described in Literature 1 and EP 0911926A1, however, the loss of the pump light is great because the signal light wavelength is at 1.55 μm wavelength band in which the transmission loss of the optical fiber for Raman amplification becomes the smallest and the pump light wavelength is in the range of 1.45 μm to 1.53 μm. Furthermore, there is a limit to increasing the power of the pump light which is to be introduced into the optical fiber for Raman amplification because the power of light that is output from a semiconductor laser light source which is generally used as a pump light source is limited and because a light amplifier that can amplify light in the wavelength range of 1.45 μm to 1.53 μm is not yet available. Therefore, there is also a limit to increasing a Raman amplification gain in a Raman amplifier.

SUMMARY OF THE INVENTION

A Raman amplifier according to the present invention is provided with an optical fiber for transmitting signal light and Raman-amplifying the signal light by means of pump light introduced thereinto. It is also provided with a means for introducing into the optical fiber for Raman amplification light, as pump light, whose wavelength is within the amplification wavelength band of EDFA. Thus, the wavelength of the pump light for Raman amplification becomes the wavelength that minimizes the transmission loss in a silica-based optical fiber. Therefore, the pump light for Raman amplification propagates through the optical fiber for Raman amplification at a low loss, and the Raman amplification gain can be increased in the Raman amplifier accordingly.

An optical transmission system according to the present invention is characterized in that (1) a Raman amplifier is provided in a repeater section thereof, (2) the Raman amplifier is equipped with an optical fiber for transmitting signal light and Raman-amplifying the signal light by means of pump light introduced thereinto, as well as with a means of introducing light, as the pump light, whose wavelength is within the amplification wavelength band of EDFA into the optical fiber for Raman amplification and (3) the optical fiber for Raman amplification constitutes a part or the whole of the optical transmission line of the repeater section.

In this optical transmission system it is possible to attain an excellent transmission characteristic by making the power of signal light which reaches the receiving end to be sufficiently large while restraining nonlinear optical phenomena from occurring because of the signal light power becoming too great in each place of the optical transmission line. Moreover, the Raman amplification gain of the signal light in the Raman amplifier can be made sufficiently great to perform a long distance optical transmission.

The optical fiber according to the present invention typically has an absolute value of chromatic dispersion in the range of about 0.1 to 10 ps/nm/km at 1.65 μm wavelength. By using this optical fiber as an above-mentioned optical fiber for Raman amplification, an excellent transmission characteristic can be attained because the waveform distortion of the signal light can be restrained from occurring due to the accumulation of chromatic dispersions in the optical fiber for Raman amplification and because the interaction between channels by the nonlinear optical effect in wavelength-multiplexing transmission can be restrained.

The optical fiber according to the present invention is characterized in that its effective area at 1.55 μm wavelength is equal to or less than 85% of its effective area at 1.65 μm wavelength. By using the optical fiber of the present invention as above-mentioned optical fiber for Raman amplification, the Raman amplification gain becomes great because the nonlinearity of the optical fiber for Raman amplification is great at a pump light wavelength, and deterioration of the transmission characteristics of the signal light due to the nonlinear optical effect can be restrained because the nonlinearity of the optical fiber for Raman amplification is small at a signal light wavelength.

The above and further objects and novel features of the invention will be more fully clarified from the following detailed description when the same is read in connection with the accompanying drawings. It is to be expressly noted, however, that the drawings are for the purpose of illustration only and not intended for a definition limiting the scope of the invention.

BRIEF DESCRIPTION OF THE DRAWING

In order to more fully understand the drawings used in the detailed description of the present invention, a brief description of each drawing is provided.

DESCRIPTION OF THE PREFERRED EMBODIMENT

Figure 1:
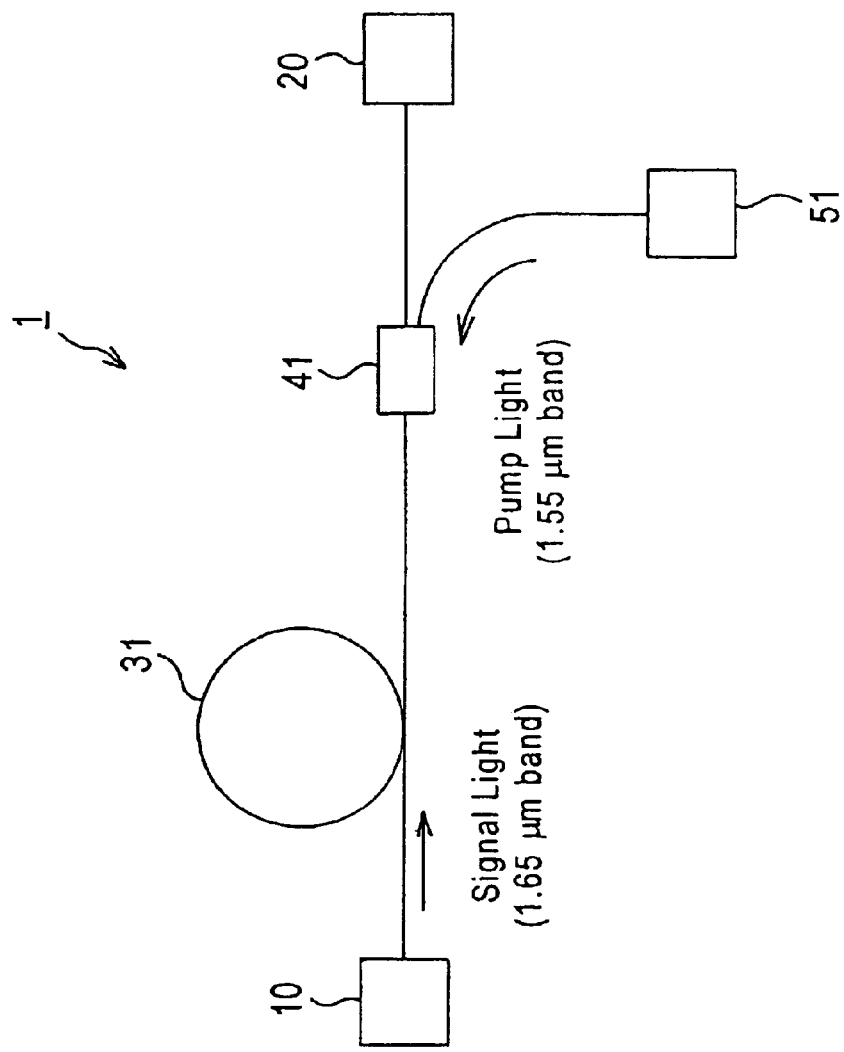
FIG. 1 is a schematic drawing showing a Raman amplifier and optical transmission system according to a first embodiment of the present invention.

In the following, preferred embodiments of the present invention will be explained in detail with reference to the accompanying drawings. To facilitate the comprehension of the explanation, the same reference numerals denotes the same parts, where possible, throughout the drawings, and a repeated explanation will be omitted. The dimensions in the drawings are partly exaggerated and do not always correspond to actual ratios of dimensions.

Embodiment 1

An optical transmission system 1 according to the first embodiment is, as shown in FIG. 1, equipped with an optical fiber 31 for Raman amplification and an optical multiplexer 41 between a transmitter or repeater 10 and a receiver or repeater 20 in the order of enumeration. In addition, it is equipped with a pump light source 51 for Raman amplification that is connected with the optical multiplexer 41. Of these, the optical fiber 31, the optical multiplexer 41 and the pump light source 51 for Raman amplification constitute a Raman amplifier.

The optical fiber 31 for Raman amplification is several km to hundreds of km in length and is the optical transmission line that transmits signal light in the optical transmission system 1. It is also a light amplification medium that Raman-amplifies signal light by the pump light for Raman amplification introduced thereinto. The optical fiber 31 is made of silica-based glass and is a single mode at a signal light wavelength band.

A semiconductor laser light source is preferably used for the pump light source 51 for Raman amplification. The optical multiplexer 41 introduces the pump light, which has been output from the light source 51, into the optical fiber 31 for Raman amplification, and allows the signal light that has been Raman-amplified in the optical fiber 31 to pass therethrough to the receiver 20. The wavelength of the pump light for Raman amplification is about 0.1 $\mu$m shorter than the wavelength of the signal light.

In the optical transmission system 1, the pump light that has been output from the pump light source 51 for Raman amplification is introduced into the optical fiber 31 for Raman amplification via the optical multiplexer 41. The signal light that has been sent out from the transmitter 10 is incident on the optical fiber 31, and while propagating therethrough, it is Raman-amplified at the same time as it suffers a loss. Then, the signal light reaches the receiver 20 via the optical multiplexer 41, and is received by the receiver 20.

In the present embodiment, the wavelength of the pump light that is output from the pump light source 51 for Raman amplification is the wavelength that is within the amplification wavelength band of EDFA, that is, the wavelength that the transmission loss becomes the smallest in the optical fiber for Raman amplification. More specifically, the wavelength of the pump light is within C-band (1530 nm–1565 nm) or L-band (1570 nm–1605 nm). Then, the wavelength of the signal light to transmit from the transmitter 10 to the repeater 20 is 1.65 $\mu$m band, which is the wavelength band where Raman-amplification can be performed by the pump light.

Since the pump light of C-band or L-band can propagate at a low loss in the optical fiber 31 for Raman amplification, the gain of the Raman amplifier becomes great. Though the transmission loss of the signal light itself becomes great because the wavelength of the signal light is at a 1.65 $\mu$m band, the effective loss becomes small because the Raman amplification gain is great. Accordingly, in the optical transmission system 1, since the power of the signal light that reaches the receiving station 20 can be made sufficiently great without making the power of the signal light in each place of the optical transmission line great, the nonlinear optical effect can be restrained and excellent transmission characteristics can be obtained.

The absolute value of chromatic dispersions of the optical fiber 31 for Raman amplification is preferably in the range of 0.1 to 10 ps/nm/km at 1.65 $\mu$m wavelength. By making the absolute value of the chromatic dispersions 10 ps/nm/km or less, the waveform deterioration of the signal light due to the accumulation of the chromatic dispersions in the optical fiber 31 can be restrained. On the other hand, by making the absolute value of the chromatic dispersions 0.1 ps/nm/km or more, the interaction between the channels due to the nonlinear optical effect in the case of wavelength-multiplexing transmission can be restrained. Therefore, superior transmission characteristics can be attained.

In the optical fiber 31 for Raman amplification the effective area at 1.55 $\mu$m wavelength is preferably 85% or less of the effective area at 1.65 $\mu$m wavelength. In the pump light wavelength the Raman amplification gain becomes great because the nonlinearity of the optical fiber 31 is great, and in the signal light wavelength the deterioration of transmission characteristic of the signal light can be restrained because the nonlinearity of the optical fiber 31 is small.

Embodiment 2

Figure 2:
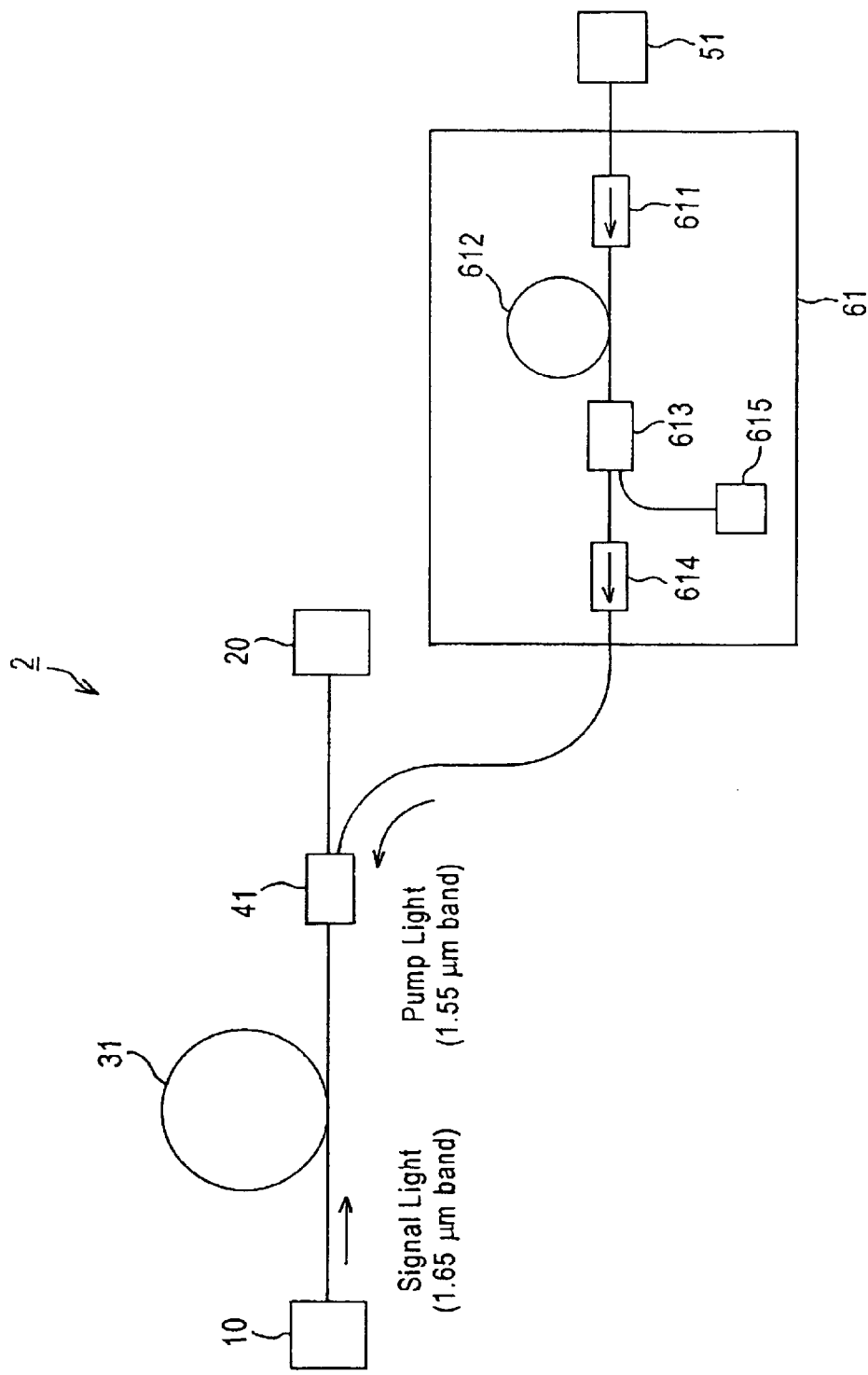
FIG. 2 is a schematic drawing showing a Raman amplifier and optical transmission system according to a second embodiment of the present invention.

An optical transmission system 2 according to the second embodiment is a system in which an EDFA 61 is added to the optical transmission system 1 as shown in FIG. 2. In this embodiment an optical fiber 31 for Raman amplification and an optical multiplexer 41, a pump light source 51 for Raman amplification, and the EDFA 61 constitute a Raman amplifier.

The EDFA 61 is an optical fiber amplifier in which an Er-doped fiber 612 is used as a light amplification medium. The EDFA 61 amplifies the pump light of C-band or L-band for Raman amplification which has been output from the pump light source 51 for Raman amplification, and outputs the pump light to the optical multiplexer 41. It is preferable that the pump light for Raman amplification is 1535 nm or more but not more than 1605 nm because the pump light for Raman amplification does not overlap with the proximity of 1530 nm that is the lowest limit of the amplification wavelength band of the EDFA 61. Thus, the EDFA 61 can amplify the pump light for Raman amplification stably at a great gain.

The EDFA 61 is equipped with an optical isolator 611, the Er-doped fiber 612, an optical multiplexer 613, and an optical isolator 614 in the order of enumeration from the input end to the output end, and also equipped with a pump light source 615 which is connected with the optical multiplexer 613.

The Er-doped fiber 612 is a silica-based optical fiber, and amplifies the pump light of C-band or L-band which has been output from the pump light source 51 for Raman amplification, by the pump light of 0.98 $\mu$m or 1.48 $\mu$m wavelength which has been output from the pump light source 615 and introduced thereinto. The optical isolators 611 and 614 respectively allow the pump light for Raman amplification that has been output from the light source 51 to pass in the forward direction but insulates the light to advance towards the opposite direction. The pump light source 615 is used for outputting the pump light to excite the Er in the Er-doped fiber 612. For this light source, a semiconductor laser is preferably employed because it is small. The optical multiplexer 613 introduces the pump light that has been output from the pump light source 615 into the Er-doped fiber 612, and allows the pump light for Raman amplification that has been amplified by the Er-doped fiber 612 to pass to the optical isolator 614.

In this optical transmission system 2, the pump light that has been output from the pump light source 51 for Raman amplification is amplified by the EDFA 61 and is introduced into the optical fiber 31 for Raman amplification via the optical multiplexer 41. The signal light that has been sent out from the transmitter 10 is incident on the optical fiber 31, and while propagating therethrough, it is Raman-amplified at the same time as it suffers a loss. Then, the signal light reaches the receiver 20 via the optical multiplexer 41, and is received by the receiver 20.

The optical transmission system 2 according to the present embodiment can attain a greater Raman amplification gain because it can introduce the pump light of a high power into the optical fiber 31 in addition to the effect of the optical transmission system 1.

Next, a concrete implementation example of the optical transmission system 2 is explained. In this implementation example, the wavelength of the signal light that is sent out from the transmitter 10 is 1660 nm. The wavelength of the pump light that is output from the pump light source 51 for Raman amplification is 1550 nm, and this pump light is amplified through the EDFA 61 until the power becomes 5 W. As for the optical fiber 31 for Raman amplification, the chromatic dispersion is 2.5 ps/nm/km, the dispersion slope is 0.07 ps/nm$^2$/km, the transmission loss is 0.22 dB/km, and the effective area is 57 $\mu$m$^2$ at the signal light wavelength of 1660 nm. The optical fiber 31 also gives a transmission loss of 0.20 dB/km and an effective area of 44 $\mu$m$^2$ at the 1550 nm pump light wavelength for Raman amplification.

Thus, since the pump light for Raman amplification that has been amplified is introduced into the optical fiber 31 for Raman amplification, and the wavelength of the pump light for Raman amplification is 1550 nm, in which the transmission loss of the optical fiber 31 is small, a greater Raman amplification gain can be attained than in the past. Furthermore, while restraining the transmission characteristic deterioration of the signal light due to the nonlinear optical effect, a greater Raman amplification gain can be attained because the effective area of the optical fiber 31 is as great as 57 $\mu$m$^2$ in the signal light wavelength of 1660 nm and is as small as 44 $\mu$m$^2$ in the 1550 nm pump light wavelength for Raman amplification. Moreover, the waveform distortion of the signal light due to the accumulation of the chromatic dispersions in the optical fiber for Raman amplification can be restrained because the absolute value of the chromatic dispersions of optical fiber 31 is small in the signal light wavelength of 1660 nm.

Embodiment 3

Figure 3:
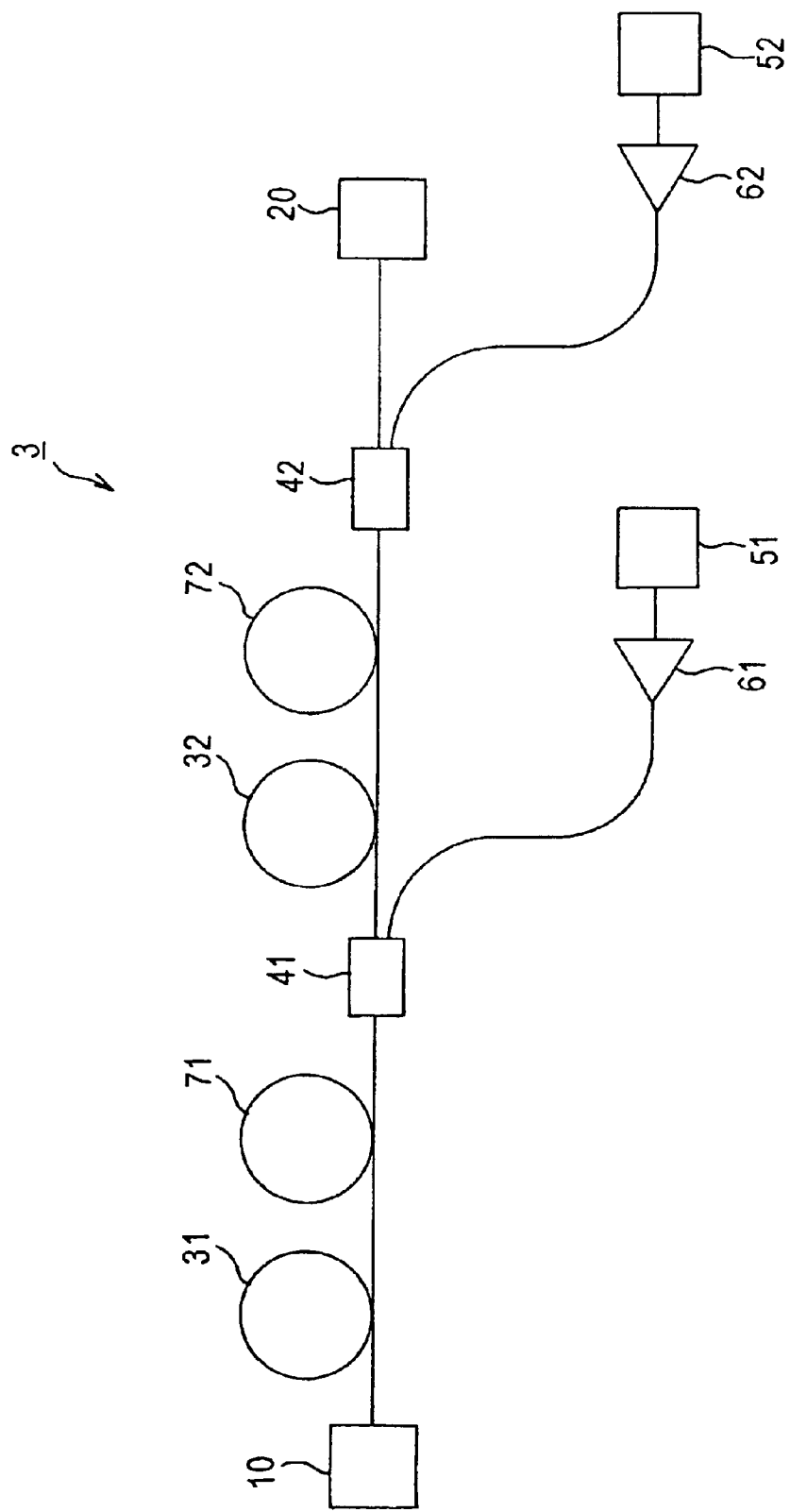
FIG. 3 is a schematic drawing showing a Raman amplifier and optical transmission system according to a third embodiment of the present invention.

As shown in FIG. 3, an optical transmission system 3 according to the third embodiment is equipped with an optical fiber 31 for Raman amplification, a dispersion compensating optical fiber 71, an optical multiplexer 41, an optical fiber 32 for Raman amplification, a dispersion compensating optical fiber 72, and an optical multiplexer 42, which are positioned between a transmitter or repeater 10 and a receiver or repeater 20, in the order of enumeration. In addition, a pump light source 51 for Raman amplification is connected with the optical multiplexer 41, and a pump light source 52 for Raman amplification is connected with the optical multiplexer 42.

Each of the optical fibers 31 and 32 for Raman amplification is several km and hundreds of km in length and constitutes the optical transmission line which transmits signal light in the optical transmission system 3. It is also the light amplification medium that Raman-amplifies the signal light by the pump light for Raman amplification introduced thereinto. Each of these optical fibers 31, 32 is a single mode in the signal light wavelength band. It is made of silica-based glass.

In each of the dispersion compensating optical fibers 71, 72, either of the chromatic dispersion and the dispersion slope in the signal light wavelength has a sign that is different from that of the optical fibers 31, 32 for Raman amplification, and compensates for the chromatic dispersion and dispersion slope of the optical fibers 31, 32. The dispersion compensating optical fibers 71, 72 may be rolled up in coil and modularized, or installed as an optical transmission line like optical fibers 31, 32. The dispersion compensating optical fiber 71 and the optical fiber 31 may be connected by means of a fiber optic connector. However, in view of making a connection loss small, they should be preferably fusion-spliced. Similarly, the dispersion compensating optical fiber 72 and the optical fiber 32 may be connected by means of a fiber optic connector, but in view of making a connection loss small, they should preferably be fusion-spliced. In these dispersion compensating optical fibers 71, 72, the signal light is also Raman-amplified.

A semiconductor laser light source is preferably used for each of the pump light sources 51, 52 for Raman amplification. The optical multiplexer 41 introduces the pump light that has been output from the light source 51 and amplified through the EDFA 61 into the dispersion compensating optical fiber 71 and the optical fiber 31 for Raman amplification. It also allows the signal light that has been Raman-amplified by the dispersion compensating optical fiber 71 and the optical fiber 31 for Raman amplification to pass toward the optical fiber 32. Similarly, the optical multiplexer 42 introduces the pump light that has been output from the light source 52 and amplified by the EDFA 62 into the dispersion compensating optical fiber 72 and the optical fiber 32 for Raman amplification. It also allows the signal light that has been Raman-amplified by the dispersion compensating optical fiber 72 and the optical fiber 32 for Raman amplification to pass toward the receiver 20.

The EDFA 61 amplifies the pump light of C-band or L-band for Raman amplification that has been output from the pump light source 51 for Raman amplification, and outputs the pump light toward the optical multiplexer 41. Similarly, the EDFA 62 amplifies the pump light of C-band or L-band for Raman amplification that has been output from the pump light source 52 for Raman amplification, and outputs the pump light toward the optical multiplexer 42. Each construction of the EDFAs 61, 62 is the same with that shown in FIG. 2.

In the optical transmission system 3, the pump light that has been output from the pump light source 51 for Raman amplification is amplified by the EDFA 61 and is introduced into the dispersion compensating optical fiber 71 and the optical fiber 31 for Raman amplification via the optical multiplexer 41. Similarly, the pump light that has been output from the light source 52 is amplified by the EDFA 62 and is introduced into the dispersion compensating optical fiber 72 and the optical fiber 32 for Raman amplification via the optical multiplexer 42. The signal light that has been sent out from the transmitter 10 is received by the receiver 20 via the optical fiber 31, the dispersion compensating optical fiber 71, the optical multiplexer 41, the optical fiber 32, the dispersion compensating optical fiber 72 and the optical multiplexer 42. The signal light is Raman-amplified at the same time as it suffers a loss when it propagates through each of the optical fibers 31, 32. The signal light is also Raman-amplified at the same time as it suffers a loss when it propagates through each of the dispersion compensating optical fibers 71, 72.

The optical transmission system 3 can, in addition to the effect of the optical transmission system 1, make the accumulation of the chromatic dispersions in the optical transmission line from the transmitter 10 to the receiver 20 small in a wide signal light wavelength band. Therefore, it is suitable for performing a high-speed and long-distance wavelength-multiplexing transmission.

Next, the concrete implementation example of the optical transmission system 3 is explained. In this implementation example, the wavelengths of the signal light sent out from the transmitter 10 are 1648 nm, 1649 nm, 1650 nm and 1651 nm. These four waves of the signal light are wavelength-multiplexed and sent out from the transmitter 10 and they are demultiplexed into each wavelength of the signal light and received at receiver 20. The wavelength of the pump light output from the pump light source 51 for Raman amplification is 1545 nm, and this pump light is amplified by the EDFA 61 until its power becomes 5 W. Similarly, the wavelength of the pump light output from the light source 52 is 1545 nm, and the pump light is amplified by the EDFA 62 until its power becomes 5 W.

In each of the optical fibers 31, 32 for Raman amplification, the chromatic dispersion is 8.3 ps/nm/km, the dispersion slope is 0.06 ps/nm²/km, and the transmission loss is 0.21 dB/km in the signal light wavelength of 1650 nm. The transmission loss of each of the optical fibers 31, 32 is 0.20 dB/km in the 1545 nm pump light wavelength for Raman amplification. On the other hand, in each of the dispersion compensating optical fibers 71, 72, the chromatic dispersion is −41.8 ps/nm/km, the dispersion slope is −0.31 ps/nm²/km and the transmission loss is 0.35 dB/km in the signal light wavelength of 1650 nm. The transmission loss of each of the dispersion compensating optical fibers 71, 72 is 0.33 dB/km in the 1545 nm pump light wavelength for Raman amplification.

Thus, the pump light for Raman amplification that has been amplified by the EDFAs 61, 62 is introduced into the optical fibers 31, 32 for Raman amplification and the dispersion compensating optical fibers 71, 72, and the transmission loss of the optical fibers 31, 32 is small at the 1545 nm wavelength of the pump light for Raman amplification. Therefore, the Raman amplification gain becomes greater than in the past. In the signal light wavelength, the chromatic dispersion of the optical fibers 31, 32 has a sign opposite to that of the chromatic dispersion of the dispersion compensating optical fibers 71, 72. In addition, the dispersion slope of the optical fibers 31, 32 has a sign opposite to that of the dispersion slope of the dispersion compensating optical fibers 71, 72. Accordingly, the chromatic dispersion and the dispersion slope of the optical fibers 31, 32 are compensated with the dispersion compensating optical fibers 71, 72 such that the accumulation of the chromatic dispersions in the optical transmission line from the transmitter 10 to the receiver 20 can be restrained in the wide signal light wavelength band. It is therefore suitable for performing a high-speed and long-range wavelength-multiplexing transmission.

What is claimed is:

1. A Raman amplifier which is provided with an optical fiber for Raman amplification and a pump light introducing means, said optical fiber transmitting signal light and Raman-amplifying said signal light by pump light introduced thereinto, said pump light introducing means introducing, as said pump light, light having a wavelength that is within the amplification wavelength band of an Er-doped optical fiber amplifier into said optical fiber for Raman application, wherein the wavelength of said pump light is more than 1530 nm but not more than 1605 nm, and wherein said pump light introducing means has a semiconductor laser light source as a pump light source for Raman amplification.

2. A Raman amplifier according to claim 1, wherein said pump light introducing means is provided with an Er-doped optical fiber amplifier which amplifies said pump light and introduces said amplified pump light into said optical fiber for Raman amplification.

3. A Raman amplifier which is provided with an optical fiber for Raman amplification and a pump light introducing means, said optical fiber transmitting signal light and Raman-amplifying said signal light by pump light introduced thereinto, said pump light introducing means introducing, as said pump light, light having a wavelength that is within the amplification wavelength band of an Er-doped optical fiber amplifier into said optical fiber for Raman amplification, wherein the wavelength of said pump light is 1535 nm or more but not more than 1605 nm, and wherein said pump light introducing means has a semiconductor laser light source as a pump light source for Raman amplification.

4. A Raman amplifier which is provided with an optical fiber for Raman amplification and a pump light introducing means, said optical fiber transmitting signal light and Raman-amplifying said signal light by pump light introduced thereinto, said pump light introducing means introducing, as said pump light, light having a wavelength that is within the amplification wavelength band of an Er-doped optical fiber amplifier into said optical fiber for Raman amplification, wherein the absolute value of the chromatic dispersion in 1.65 μm wavelength of said optical fiber for Raman amplification is in the range of 0.1 to 10 ps/nm/km.

5. A Raman amplifier which is provided with an optical fiber for Raman amplification and a pump light introducing means, said optical fiber transmitting signal light and Raman-amplifying said signal light by pump light introduced thereinto, said pump light introducing means introducing, as said pump light, light having a wavelength that is within the amplification wavelength band of an Er-doped optical fiber amplifier into said optical fiber for Raman application, wherein the wavelength of said pump light is more than 1530 nm but not more than 1605 nm, and wherein the effective area of said optical fiber for Raman amplification at 1.55 μm wavelength is equal to or less than 85% of the effective area at 1.65 μm wavelength.

6. An optical transmission system provided with a Raman amplifier in a repeater section thereof, said Roman amplifier being equipped with (1) an optical fiber for Roman-amplification which transmits signal light and Raman-amplifies the signal light by means of pump light introduced thereinto, and (2) a means of introducing light, as said pump light, whose wavelength is within the amplification wavelength band of an Er-doped optical fiber amplifier into said optical fiber for Roman amplification, and said optical fiber for Roman amplification constituting a part or the whole of the optical transmission line of said repeater section, wherein the wavelength of said pump light is more than 1530 nm but not more than 1605 nm.

7. An optical transmission system provided with a Raman amplifier in a repeater section thereof, said Raman amplifier being equipped with (1) an optical fiber for Roman-amplification which transmits signal light and Raman-amplifies the signal light by means of pump light introduced thereinto, and (2) a means of introducing light, as said pump light, whose wavelength is within the amplification wavelength band of an Er-doped optical fiber amplifier into said optical fiber for Roman amplification, and said optical fiber for Raman amplification constituting a part or the whole of the optical transmission line of said repeater section, wherein said optical transmission line is further provided with a dispersion compensating fiber, the chromatic dispersion of said optical fiber for Roman amplification having a sign opposite to that of the chromatic dispersion of said dispersion compensating optical fiber, the dispersion slope of said optical fiber for Roman amplification having a sign opposite to that of the dispersion slope of said dispersion compensating optical fiber.

8. An optical fiber having an absolute value of chromatic dispersion in the range of about 0.1 to 10 ps/nm/km at 1.65 μm wavelength.

9. An optical fiber whose effective area at 1.55 μm wavelength is equal to or less than 85% of its effective area at 1.65 μm wavelength.

10. A Raman amplifier which is provided with an optical fiber for Raman amplification and a pump light introducing means, said optical fiber transmitting signal light and Raman-amplifying said signal light by pump light introduced thereinto, said pump light introducing means introducing, as said pump light, light having a wavelength that is within the amplification wavelength band of an Er-doped optical fiber amplifier into said optical fiber for Raman application, wherein the wavelength of said pump light is more than 1530 nm but not more than 1605 nm, and wherein said pump light introducing means have an optical multiplexer.

11. A Raman amplifier which is provided with an optical fiber for Raman amplification and a pump light introducing means, said optical fiber transmitting signal light and Raman-amplifying said signal light by pump light introducing thereinto, wherein an effective core area of said optical fiber at pump light wavelength is equal to or less than 85% of the effective core area at signal light wavelength.

12. An optical transmission system provided with a Raman amplifier according to claim 11 in a repeater section thereof and said optical fiber for Raman amplification constituting a part of the whole of the optical transmission line of said repeater section.

* * * * *